United States Patent [19]

Lopez

[11] 4,203,329

[45] May 20, 1980

[54] DEVICE FOR CONVERTING A UNIFORM CIRCULAR MOVEMENT INTO A VARIABLE OR UNIFORM LONGITUDINAL MOVEMENT

[75] Inventor: Manuel A. Lopez, Madrid, Spain

[73] Assignee: Technoresinas Espanola, S. A., Madrid, Spain

[21] Appl. No.: 822,713

[22] Filed: Aug. 8, 1977

[30] Foreign Application Priority Data

May 4, 1977 [ES] Spain ................................ 458.456

[51] Int. Cl.$^2$ ............................................ F16H 27/02
[52] U.S. Cl. ..................................... 74/89.2; 74/425
[58] Field of Search ......................... 74/89.2, 25, 425

[56] References Cited

U.S. PATENT DOCUMENTS

| 2,638,277 | 5/1953 | Miller | 74/425 |
| 3,365,974 | 1/1968 | Lieberman | 74/425 |
| 3,377,879 | 4/1968 | Shiwaku | 74/425 |

Primary Examiner—Samuel Scott
Assistant Examiner—Wesley S. Ratliff, Jr.

Attorney, Agent, or Firm—Friedman, Goodman & Teitelbaum

[57] ABSTRACT

The present invention relates to a device for converting a uniform circular movement into a variable or uniform longitudinal movement. The device comprises being arranged an assembly of rods forming the generatrices of a right cylinder having a circular section. The rods may rotate with a constant angular speed. The rods are grooved with notches at equal or different distances between the notches, which grooves house a wire or cable, wound helicoidally on the cylindrical body established by the rods, so that upon the latter rods rotating, the cable generates a longitudinal movement in the direction of the axis of the rods. The movement is uniform on the stretches in which the grooves are equidistant, and is in such a form that if the distance between grooves varies in accordance with differential elements, the longitudinal movement is obtained whose velocities in relation to time would vary from zero to a maximum and again to zero. This makes it possible to establish a distribution of speeds that would respond to a pre-established law of velocities.

3 Claims, 4 Drawing Figures

DEVICE FOR CONVERTING A UNIFORM CIRCULAR MOVEMENT INTO A VARIABLE OR UNIFORM LONGITUDINAL MOVEMENT

This invention is concerned with a device for converting a uniform circular movement into either a variable or a uniform longitudinal movement, whose novelty represents an evident and substantial improvement over all that is known in the present state of the art.

This invention has been especially developed for the manufacture of tubular forms and elements of cardboard, strip steel, polyvinyl strip, or similar materials, as well as for reinforced polyester tubes.

The device described also makes possible the study of the movement in order to apply it to any machine which, in its manufacturing process, needs movements of linear or variable speed.

The device essentially consists of an arrangement of a series of rods of circular section with prefixed length and diameter. The rods are situated in accordance with the generatrices of a right cylinder with a circular section of a suitable diameter. The rods are provided with a series of equidistant notches having a certain degree of inclination, whereby, going around the outer periphery of the assembly of rods, the above-mentioned notches establish a helicoidal alignment that makes it possible to wind a cable or wire so that the latter adopts a helix around the right cylinder formed by the rods. With the rods so arranged, a circular and uniform movement is simultaneously imparted to each of the rods around its respective axis, in such a way that the cable generates a longitudinal movement of adequate linear velocity in the elongated direction of the rods.

If,
g = angular speed of the rods
p = pitch of the helix
d = diameter of the rods
D = diameter of the right cylinder
V = forward linear velocity the analytical formula that connects these variables is:

$$V = \frac{\pi \cdot d \cdot g}{\sqrt{\pi^2 \cdot D^2 + p}}$$

As may be appreciated, d, g and D being constant; V will vary with p. In this manner, a device is obtained in which if p is constant, V is also constant. With uniform rotary movement g, a uniform forward movement V is obtained. If p is not constant along the length of the cylinder different speeds V are obtained as a function of the pitch and the angular constant velocity g of the rods.

In summary, with a constant angular velocity g of the rods of diameter d, either a uniform or a variable linear velocity V is obtained along the length of the generatrices.

Hence it is easily deduced that this mechanism will consist of a support structure which maintains the rods in space in accordance with rectilinear generatrices of a right cylinder with circular section. The mechanism causes the said rods to rotate by means of the application of a suitable transmission system coupled to a driving group with its corresponding reducer group. The movement is in such a way that the said rods adopt a constant angular movement.

In this way, as has previously been said, it is possible to manufacture tubular forms of any kind provided that for each use the device which is the subject of this patent application is provided with the necessary accessory elements to obtain the corresponding manufactured product.

For the purpose of providing the most exact interpretation of the subject of this patent application, there is represented in the accompanying drawings attached to this an example of a practical form for the industrial embodiment of the invention.

Figure 1:
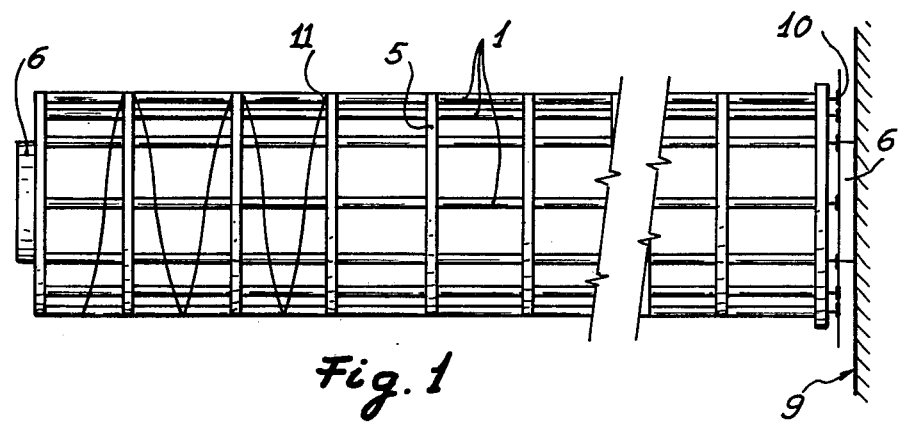
FIG. 1 shows a diagrammatic arrangement of part of the mechanism of the present invention.
Figure 2:
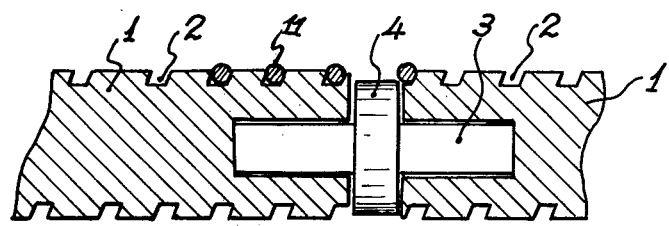
FIG. 2 represents a fractional section of one of the rods and its coupling in a longitudinal direction.
Figure 3:
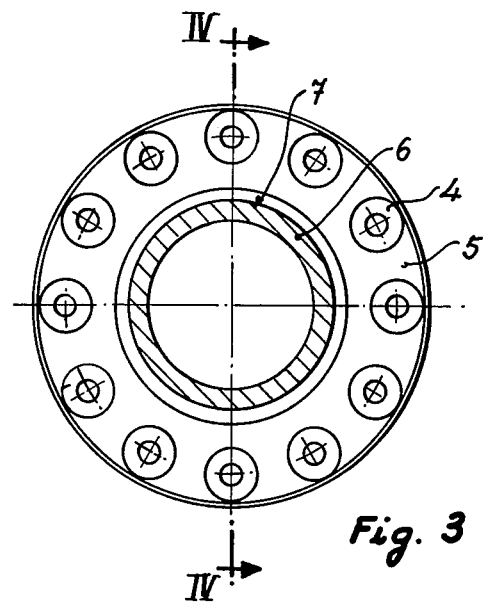
FIG. 3 shows a profile view taken along line III—III of FIG. 4 and showing a retaining washer.

In accordance with the invention, this device consists of a series of cylindrical rods (1) of suitable length and diameter, adapted to being assembled in space in accordance with the generatrices of a right cylinder with circular section, as shown in FIG. 1. The right cylinder is of prefixed diameter and variable length. The rods are capable of uniform circular movement. Each of the rods referred to is provided with a number of equidistant notches or grooves (2) with a certain degree of inclination, as shown in FIG. 2. With the rod assembled in space at their position around the right cylinder, the above-mentioned notches (2) determine on the periphery of the right cylinder an alignment in the form of a helix of a prefixed pitch making possible the winding of a wire or cable (11) around the periphery of the right cylinder and supported in the notches of the rods.

With the purpose of obtaining a considerable length of the rods while avoiding the possibility that the rods (1) may bend, it is necessary that each rod section has a given length and the desired a total and definitive length is obtained by means of the axial coupling of rod sections (1). The rods are then supported and specifically at the point of coupling by a number of washers (5) suitably distributed. Each washer has a series of orifices provided around a common circumference. In each orifice a ball bearing (4) is housed. Through the center of each ball bearing is an axial coupled shank which interconnects adjacent sections of the rods.

Figure 4:
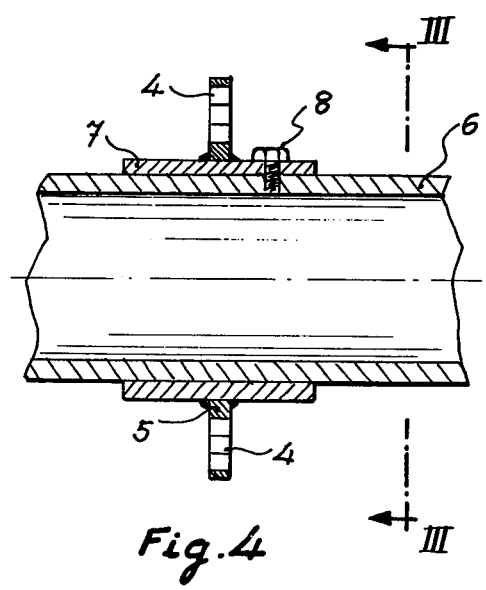
FIG. 4 shows a detail of the support cylinder in longitudinal section.

The said washers (5) are fixed onto a tubular support (6) of by means of a bushing (7) making a solid unit with the washers (5). The bushings remain fixed to the support (6) with one or more radial screws (8) as shown in FIG. 4.

By means of the tubular support (6) or other suitable supports, the mechanism described is assembled on a support structure (9) in the form of a chassis, bed plate, etc. In the washer (5) nearest to the above-mentioned support structure (9), or on another suitable support piece, there is arranged a number of terminals or of the rods (1). Through the said terminals there may be established means of coupling and transmission (10) suitable to simultaneously produce in the above-mentioned rods (1) a uniform rotary movement.

Upon generating of the uniform circular movement in the rods (1) around their respective axes, the cable or wire (11) generates a longitudinal movement of adequate linear velocity in the elongated direction of the generatrices, since the cable referred to is wound forming a helix on the cylinder established by the rods (1).

The movement of the rods (1) may be produced by means of a motor group, velocity variator, reducer and elastic coupling transmitting a circular movement to a number of pinions of a suitable gearbox and from this by means of the necessary coupling devices (10) to generate the angular movement of the rods (1).

What is claimed is:

1. A device for converting a uniform circular movement selectively into a variable or a uniform longitudinal movement, said device comprising:

an assembly of elongated circular rods spatially located at the generatrices of a right cylinder, said rods being capable or respective rotation about their own axes with all said rods rotating about their own axes at a constant angular speed, each rod having circular grooves respectively provided around its periphery, said grooves being selectively spaced from each other along each rod, said grooves on said rods being arranged respectively from one to another to provide a helicoidal alignment around the assembly of rods, wire means housed in said grooves and being helically wound about said assembly or rods in said helicoidal alignment of said grooves, whereby the rotating of said rods about their own axes generates a longitudinal movement of said wire means, said longitudinal movement being uniform when portions of said rods have the grooves equidistantly spaced from each other, and said longitudinal movement being variable when the distance between the grooves varies in accordance with differential elements such that a longitudinal movement is obtained whose velocities with respect to time vary from zero to a maximum and then back to zero so that a distribution of speeds is achieved which responds to a preestablished law of velocities.

2. A device as in claim 1, wherein each of said rods is formed of a plurality of coaxially aligned sections, and further comprising a tubular support coaxial with the right cylinder, a series of circular washers positioned around said tubular support and axially spaced therealong, each washer supporting a number of bearing supports located radially outward of said tubular support and angularly positioned from each other along a circumferential line corresponding to the circumference of the right cylinder, each bearing support respectively associated with one of said rods, and a shank rotatingly supported in each bearing support, each shank respectively coupling adjacent sections of a rod.

3. A device as in claim 1, and further comprising means for simultaneously rotating all of said rods about their respective axes with a common angular velocity.

* * * * *